United States Patent [19]

Moseley et al.

[11] 4,369,128

[45] Jan. 18, 1983

[54] CATALYST FOR OXIDATION

[75] Inventors: Fred Moseley, Cobham, United Kingdom; Paul N. Dyer, Allentown, Pa.

[73] Assignee: Air Products and Chemicals, Inc., Allentown, Pa.

[21] Appl. No.: 256,426

[22] Filed: Apr. 22, 1981

[30] Foreign Application Priority Data

Apr. 22, 1980 [GB] United Kingdom ............... 8013165
Mar. 17, 1981 [GB] United Kingdom ............... 8108246

[51] Int. Cl.$^3$ .............................................. B01J 31/22
[52] U.S. Cl. .................................. 252/429 R; 423/584
[58] Field of Search .................... 252/429 R; 423/584

[56] References Cited

U.S. PATENT DOCUMENTS 3,336,112 8/1967 Hooper ................................ 423/584
4,128,627 12/1978 Dyer et al. ......................... 423/584
4,246,183 1/1981 Knifton ......................... 252/429 R X

OTHER PUBLICATIONS

Rose et al., *Condensed Chemical Dictionary*, Fifth Ed. (1956) Pub. by Reinhold Pub. Corp., N.Y, N.Y., p. 494.

*Primary Examiner*—Patrick Garvin
*Attorney, Agent, or Firm*—Michael Leach; E. Eugene Innis; James C. Simmons

[57] ABSTRACT

A catalyst suitable for use in the synthesis of hydrogen peroxide from hydrogen and oxygen is prepared by bringing hydrogen and oxygen into contact with a liquid mixture comprising a fluorocarbon and/or halofluorocarbon and water containing bis(tri(pentafluorophenyl)phosphine) palladium dichloride. When the reaction mixture is allowed to stand the catalyst appears as a black film at the interface of the organic and aqueous phases. The black film is almost totally insoluble in aqueous hydrogen peroxide.

8 Claims, 6 Drawing Figures

CATALYST FOR OXIDATION

TECHNICAL FIELD

This invention relates to a catalyst, more particularly but not exclusively for use in the manufacture of hydrogen peroxide from its constituent elements, hydrogen and oxygen. The invention also relates to a catalyst system incorporating the said catalyst and a method of preparing said catalyst.

BACKGROUND OF THE INVENTION

In our U.S. Pat. No. 4,128,627 we have described a process for producing hydrogen peroxide wherein a gaseous mixture comprising hydrogen and oxygen is contacted with a catalyst in the presence of water and an organic solvent wherein:

(i) the organic solvent is immiscible with water and unreactive with hydrogen peroxide under the contacting conditions;

(ii) the distribution coefficient for hydrogen peroxide between the water and the organic solvent is greater than 1;

(iii) the catalyst is of the formula $L_2MX_2$ wherein L is a ligand represented by the formula $A\ R_1\ R_2\ R_3$ wherein $R_1\ R_2$ and $R_3$ are alkyl, cycloalkyl or aryl groups, hydrogen or halogen, A is a Group 5b element selected from the group consisting of nitrogen, phosphorous and arsenic, M is a Group 8 metal and X is halogen, said catalyst being soluble in said organic solvent and insoluble in water; and (iv) the gaseous mixture mixture is non-ignitable under the process conditions.

In the description of this patent specification we suggested that suitable organic solvents could comprise 1,2-dichlorobenzene, chlorobenzene and xylene.

SUMMARY OF THE INVENTION

We have now discovered that substantial and unexpected advantages are obtained when the organic solvent is selected from the group consisting of fluorocarbons, halofluorocarbons and mixtures thereof. In particular, in at least preferred embodiments we have observed (compared with our previous work):

(1) high catalyst activity at low concentrations of catalyst in the organic solvent;

(2) a high rate of production of hydrogen peroxide in the aqueous phase per unit partial pressure of oxygen and per unit concentration of catalyst; and (3) the production of high concentrations of hydrogen peroxide in the aqueous phase.

According to the present invention there is provided a catalyst formed by contacting hydrogen and oxygen with a liquid reaction mixture comprising water, a fluorocarbon and/or halofluorocarbon, and bis[tri(pentafluorophenyl)phosphine] palladium dichloride.

As another embodiment of the invention there is provided a catalyst system comprising the so-formed catalyst in combination with water and a liquid fluorocarbon and/or liquid halofluorocarbon.

The fluorocarbon and/or halofluorocarbon is preferably aliphatic and should preferably be fully substituted by halogens with at least 25% of the halogen atoms, and possibly all of the halogen atoms, being fluorine. Examples of suitable perfluorocarbons include perfluoroaliphatic ethers, perfluoroalkyl tertiary amines, perfluoropentane, perfluoro-1,3-dimethylcyclohexane and mixtures thereof. Examples of suitable halofluorocarbons include 1,1,2-trichlorotrifluoroethane, 1,2-dichlorotetrafluoroethane, 1,2-dibromotetrafluoroethane and mixtures thereof.

The phase volume ratio of water to halofluorocarbon or perfluorocarbon is preferably in the range 10:1 to 1:10, the range 2:1 to 1:3 being more preferred.

DETAILED DESCRIPTION OF THE INVENTION

As indicated in U.S. Pat. No. 4,128,627:

(1) The ligand L is preferably selected from the group consisting of tri(pentafluorophenyl) phosphine, tricyclohexylphosphine and triphenylarsine.

(2) The Group 8 metal is preferably palladium.

(3) The halogen is preferably chlorine.

(4) The catalyst is preferably selected from the group consisting of bis(tri(pentafluorophenyl)phosphine) palladium dichloride, bis(tricyclohexylphosphine) palladium dichloride and bis(triphenylarsine) palladium dichloride.

(5) The gaseous mixture can comprise oxygen, hydrogen and a gas which is inert under the reaction conditions, for example nitrogen and/or methane.

(6) The gaseous mixture may consist of oxygen and hydrogen wherein the ratio of oxygen to hydrogen does not exceed 4 parts oxygen per 100 parts hydrogen (by volume).

Overall we recommend the use of the complex $Pd\ Cl_2\ (P(C_6F_5)_3)_2$ as catalyst in combination with a halofluorocarbon as organic solvent. In this embodiment we have found that the rate of hydrogen peroxide production is relatively independent of catalyst concentration in the organic phase down to $5\times10^{-5}M$. Industrially useful rates of production may be achieved using catalyst concentrations between $5\times10^{-5}M$ and $2.5\times10^{-4}M$, a factor of up to 100 less than is necessary when using previously recommended solvents, leading to a considerable reduction in capital cost. The catalyst activity factor expressed in weight % $H_2O_2$/hour/psi $O_2/10^{-1}M$ catalyst is increased to 10–40 compared with 0.2–1 using the previously recommended solvents. In addition there is a reduced tendency for the rate of hydrogen peroxide production to decrease with increasing hydrogen peroxide concentration in the aqueous phase thereby enabling higher hydrogen peroxide concentrations, for example 4.7 wt. % to be achieved whilst regularly sampling and making up the aqueous phase with deionised water.

When a halofluorocarbon is used as organic solvent the addition of 1–50,000 ppm by volume of perfluorocarbon, for example perfluoro-1,3-dimethylcyclohexane or polymeric halofluorocarbon of molecular weight greater than 300 g, for example polychlorotrifluoroethylene (Kel F oil), or up to 50 ppm (by weight) of a $C_{10}$–$C_{30}$ straight chain hydrocarbon, hydrocarbon salt, carboxylic acid, ester of a carboxylic acid or salt of a carboxylic acid or a fluorinated equivalent thereof, for example n-eicosane, stearic acid and potassium perfluorooctane sulphonate, facilitates maintaining high rates of hydrogen peroxide synthesis which are linear over extended periods. The additives must, of course, be resistant to reaction with hydrogen peroxide under the conditions of the process and may be used in combination if desired.

The aqueous and organic phases should be brought into intimate contact over a large contact area to facilitate extraction of the hydrogen peroxide into the aqueous phase as it is formed. Such contract can conveniently be achieved by a mechanical stirrer or, preferably, by sparging a gaseous mixture containing hydrogen and oxygen through the liquid.

The process is advantageously operated at superatmospheric pressure, for example 0–5000 psig and preferably at temperatures between the freezing point of the aqueous phase and 15° C., and generally between 0° and 10° C.

In each of Examples 1–10 and 20–26 hereinafter a black film was formed which, when the reaction mixture was allowed to stand, formed a layer between the aqueous phase and the organic phase. The black film could be recovered by allowing the reaction mixture to stand in a separating funnel, draining off the lower organic phase and decanting the upper aqueous phase. The black film formed a layer which clung to the sides of the separating funnel and was washed off with acetone (in which it was insoluble) and recovered by filtration.

Removal of the black film from the reaction mixture produced a drop in the rate of production of hydrogen peroxide which was approximately proportional to the fraction of the black film removed.

Whilst the activity of the black film with respect to the production of hydrogen peroxide appeared fairly constant when the black film was kept in the reaction mixture in the presence of hydrogen and oxygen or hydrogen alone it slowly decreased when the reaction mixture was kept under an atmosphere of nitrogen. Part of the activity of the black film appeared to be reattainable on reintroducing hydrogen and oxygen to the reaction mixture over a 3 hour period although full activity was not reattained.

Hydrogen peroxide is readily produced when newly prepared black film, recovered as above, is introduced into a mixture comprising a halofluorocarbon and/or fluorocarbon and water under a pressurized atmosphere of hydrogen and oxygen.

The black film may be an effective catalyst for other oxidations in a water/fluorocarbon and/or halofluorocarbon reaction mixture.

According to the present invention there is provided a catalyst formed by contacting hydrogen and oxygen with a liquid reaction mixture comprising water, a fluorocarbon and/or halofluorocarbon, and bis(tri(pentafluorophenyl)phosphine) palladium dichloride.

The present invention also provides a catalyst according to the present invention together with water and a liquid fluorocarbon and/or liquid halofluorocarbon.

Preferably, the catalyst system further comprises bis(tris(pentafluorophenyl)phosphine) palladium dichloride.

There is also provided a method of preparing a surface active catalyst film which method comprises the steps of contacting hydrogen and oxygen with water containing bis(tri(pentafluorophenyl)phosphine) palladium dichloride and a liquid fluorocarbon and/or liquid halofluorocarbon.

Without wishing to be bound by theory, it appears that in the present invention, hydrogen peroxide is synthesized at a surface active film at the interface between the organic and aqueous phases. The surface active film is formed in situ from the catalytic complex solution in the organic phase when mixed with water and contacted with the gas mixture containing hydrogen and oxygen. This leads to better utilization of low concentrations of the catalytic complex and high catalytic activity.

EXAMPLES

The following examples illustrate embodiments of the present invention and embodiments of the invention disclosed in our U.S. Pat. No. 4,128,627. The experimental procedure was as follows.

A cylindrical reactor was constructed of pyrex glass and equipped with a perforated Teflon (R.T.M.) disc gas distributor, pyrex reflux condenser, pyrex enclosed thermocouple and pyrex inlet and outlet lines. Into this reactor was loaded 180 ml. of a solution of known concentration of the catalytic complex Pd $Cl_2$ (P $(C_6F_5)_3)_2$ in the test organic solvent together with 90 ml. deionised water, and the temperature of the reactor contents was maintained between 1 and 10° C. by external refrigeration.

The following solvents were obtained from BDH Chemicals Ltd., Poole, England: 1,1,2-trichlorotrifluoroethane, and Analar grade 1,2-dichlorobenzene, benzene and xylene. For the tests of the effects of additions (Examples 22–26), the 1,1,2-trichlorotrifluoroethane was distilled before use. The perfluoro-1,3-dimethylcyclohexane was obtained from Fluorochem Ltd., Glossop, England.

A non-flammable gas mixture containing, in Examples 8, 9, 10 and 21: 3.5% $O_2$, 48.3% $H_2$, 48.2% $N_2$ and in the remaining Examples: 2.5 to 3.5% $O_2$ in $H_2$, was sparged through the reactor at a specified flow rate using a recirculating gas pump. Both inlet pressure and inlet oxygen concentration in the gas mixture were maintained automatically.

The hydrogen peroxide concentration in the aqueous phase was measured periodically during the course of each run by temporarily stopping the gas flow for 30 seconds, which allowed the liquid phases to separate, withdrawing a measured volume of the aqueous phase and pumping back into the reactor via a stainless steel diaphragm pump an equal volume of deionised water. The aqueous phase sample was then analysed for hydrogen peroxide by titration with ceric sulphate solution. The aqueous phase samples obtained in this manner were free of catalyst and entrained organic phases.

Selectivity was determined either by liquid mass balance in the reactor or by the decline of oxygen concentration in the recirculated gas mixture with the oxygen supply turned off.

Figure 1:
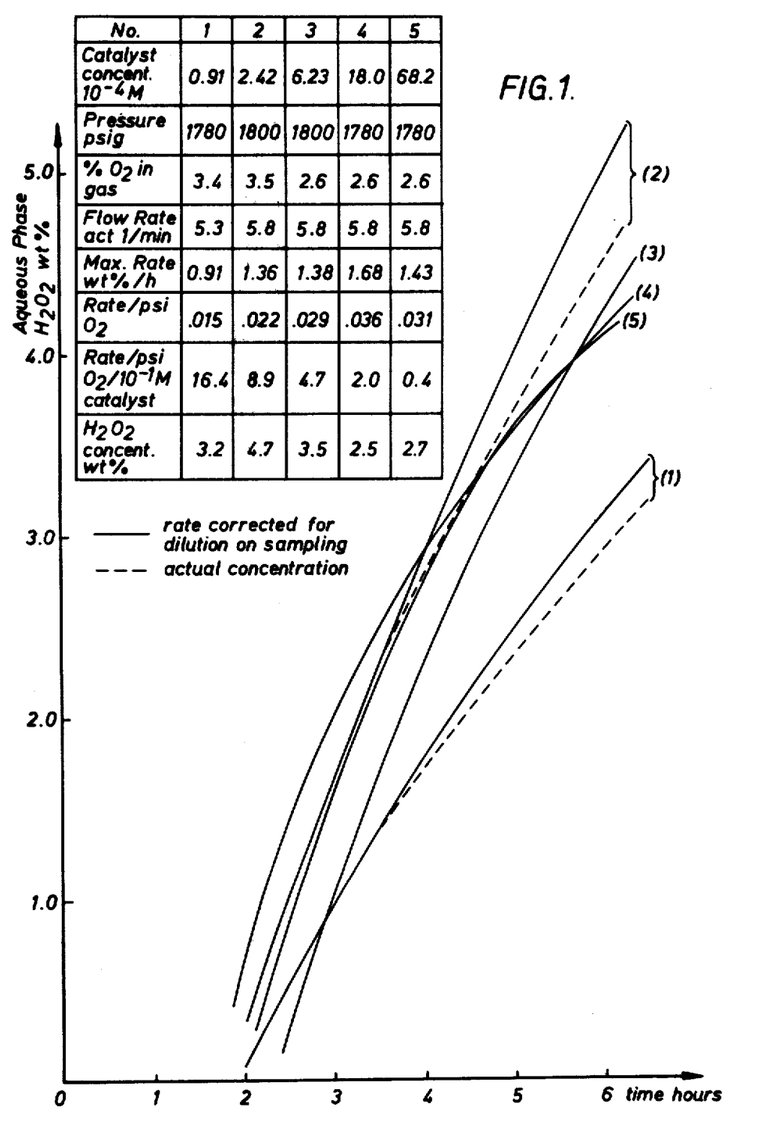
FIG. 1 illustrates embodiments of the invention at 1800 psig total pressure using 1,1,2-trichlorotrifluoroethane.

Referring to the drawings:

Examples 1–5 (FIG. 1) illustrate embodiments of the present invention at 1800 psig total pressure using 1,1,2-trichlorotrifluoroethane. As the concentration of Pd $(Cl_2 (P (C_6F_5)_3)_2$ is decreased from $6.8 \times 10^{-3}$M to $9.1 \times 10^{-5}$M, the maximum rate of hydrogen peroxide production and the specific rate/psi $O_2$ vary by factors of only 1.8 and 2.4. High catalyst activity factors of 16.4 and 8.9 (units in wt. %/h/psi $O_2/10^{-1}$M catalyst) are achieved in examples 1 and 2. The linearity of example 2 together with its high maximum rate of 1.36 wt %/h enabled 4.7 wt% hydrogen peroxide to be produced in 5 hours, even when the aqueous phase was sampled and diluted during the course of the run.

Figure 2:
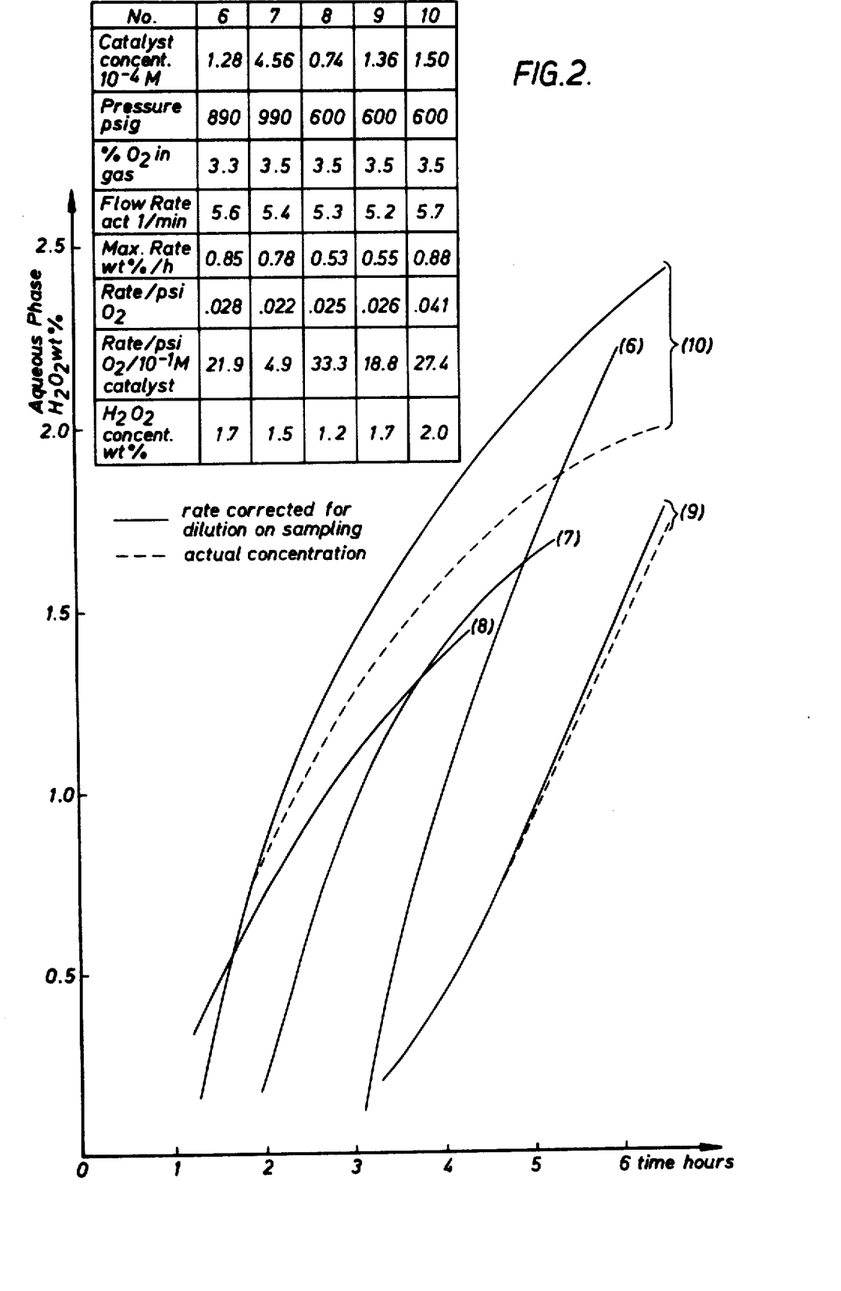
FIG. 2 illustrates embodiments of the invention using 1,1,2-trichlorotrifluoroethane at about 900 and 600 psig and various catalyst concentrations.

Examples 6–10 (FIG. 2) illustrate embodiments of the present invention using 1,1,2-trichlorotrifluoroethane at 900 and 600 psig, and catalyst concentrations over the range $4.56 \times 10^{-4}$M to $7.4 \times 10^{-5}$M. Again the results show high catalyst utilisation factors in the range of 5 to 30, and aqueous phase hydrogen peroxide concentrations up to 2 wt% obtainable in 5 hours with sampling and dilution. It will also be apparent from examples 1–10 that the specific maximum rate expressed in wt%/h/psi $O_2$ obtained is nearly constant, varying only by a factor of 2.7 over the range of operating pressures and catalyst concentrations illustrated. Selectivities were in the range 70–80 mole %.

Examples 11–14 (FIG. 3) and 15–17 (FIG. 4) illustrate the results obtained under identical conditions using the method of U.S. Pat. No. 4,128,627 at 1100 and 1800 psig respectively, with 1,2-dichlorobenzene as the organic solvent. They show that higher catalyst concentrations are needed to obtain results comparable with the other examples, i.e. at least $3–5 \times 10^{-3}$M to obtain similar rates and specific rates. This is also illustrated by the lower catalyst activity factors. Only at catalyst concentrations of the order of $6 \times 10^{-3}$M do the catalyst activity factors of the present invention fall to the same range.

Figure 3:
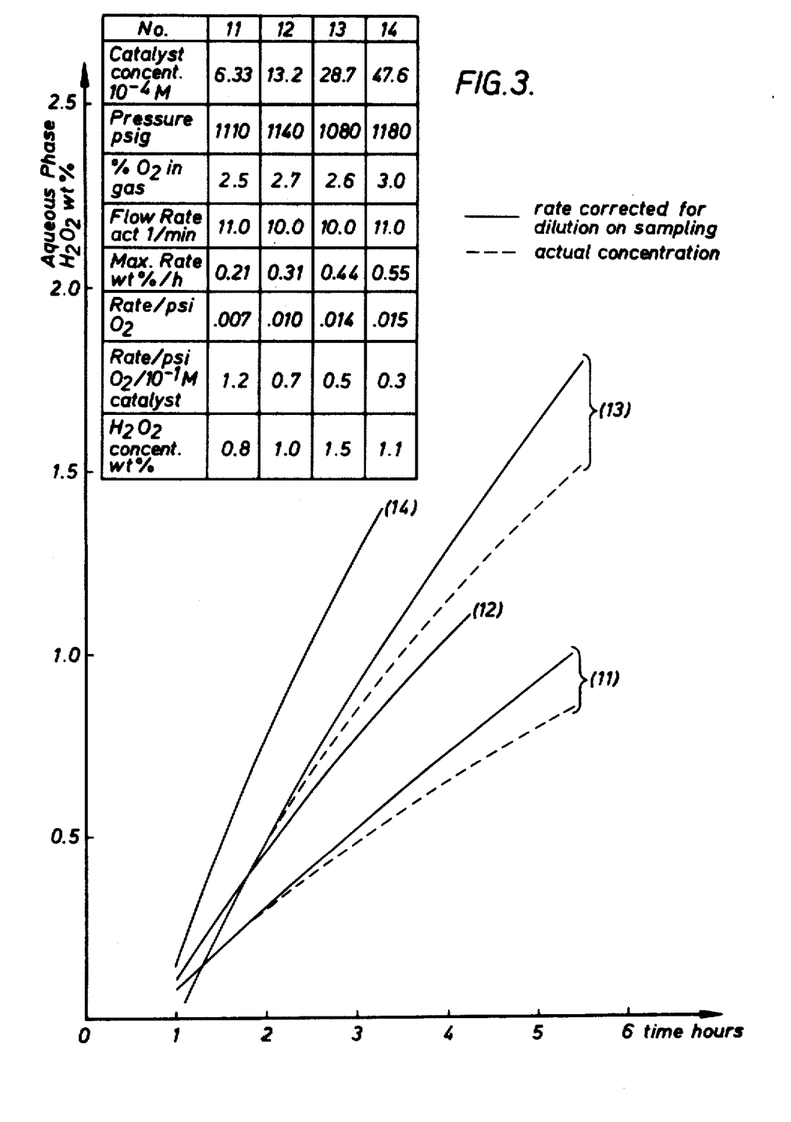
FIGS. 3 and 4 illustrate the results obtained using the method of U.S. Pat. No. 4,128,627 at about 1100 and 1800 psig with 1,2-dichlorobenzene, benzene or xylene as the organic solvent.
Figure 4:
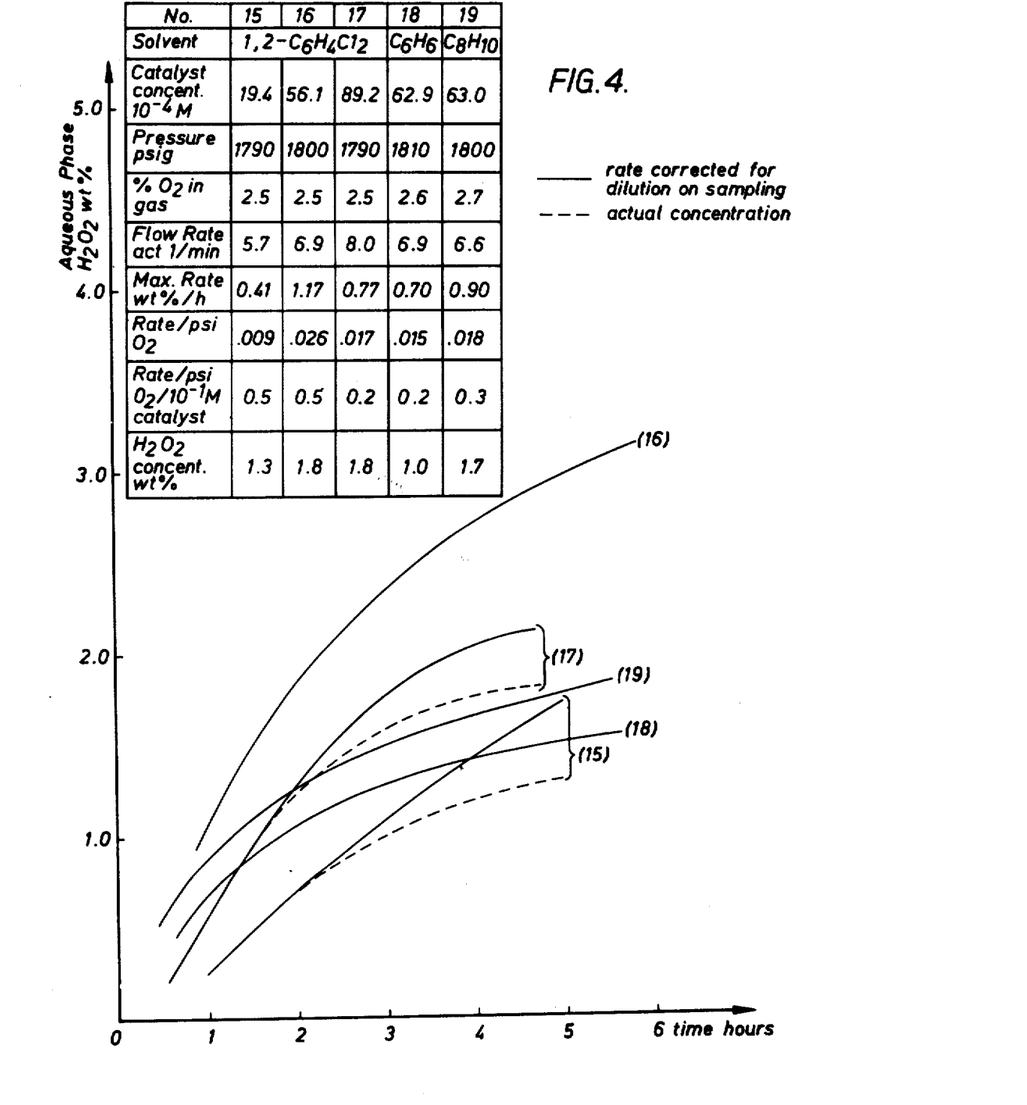

In addition, the rate of hydrogen peroxide production using 1,2-dichlorobenzene as solvent falls more rapidly with increasing hydrogen peroxide concentration greater than 1.5 wt%, so that the maximum obtained in these Examples was only 1.8 wt%.

Examples 18–19 (FIG. 4) show that the results obtained with two other solvents of the type specified in U.S. Pat. No. 4,128,627, benzene and xylene, are no better.

The following table compares examples with similar catalyst concentrations and pressures using 1,1,2-trichlorotrifluoroethane and 1,2-dichlorobenzene, and lists the improvement factors obtained by the method of the present invention.

| Compared Example Numbers | Catalyst Concentration Range $10^{-4}$M | Improvement Factors | | | |
|---|---|---|---|---|---|
| | | Ratio of Max. Rate | Ratio of Specific Rate | Ratio of Catalyst Activity | Ratio of $H_2O_2$ Concentration |
| 7–11 | 4.6–6.3 | 3.7 | 3.1 | 4.1 | 1.9 |
| 4–15 | 18–19 | 4.1 | 4.0 | 4.0 | 1.9 |
| 5–16 | 56–68 | 1.2 | 1.4 | 0.8 | 1.5 |

Figure 5:
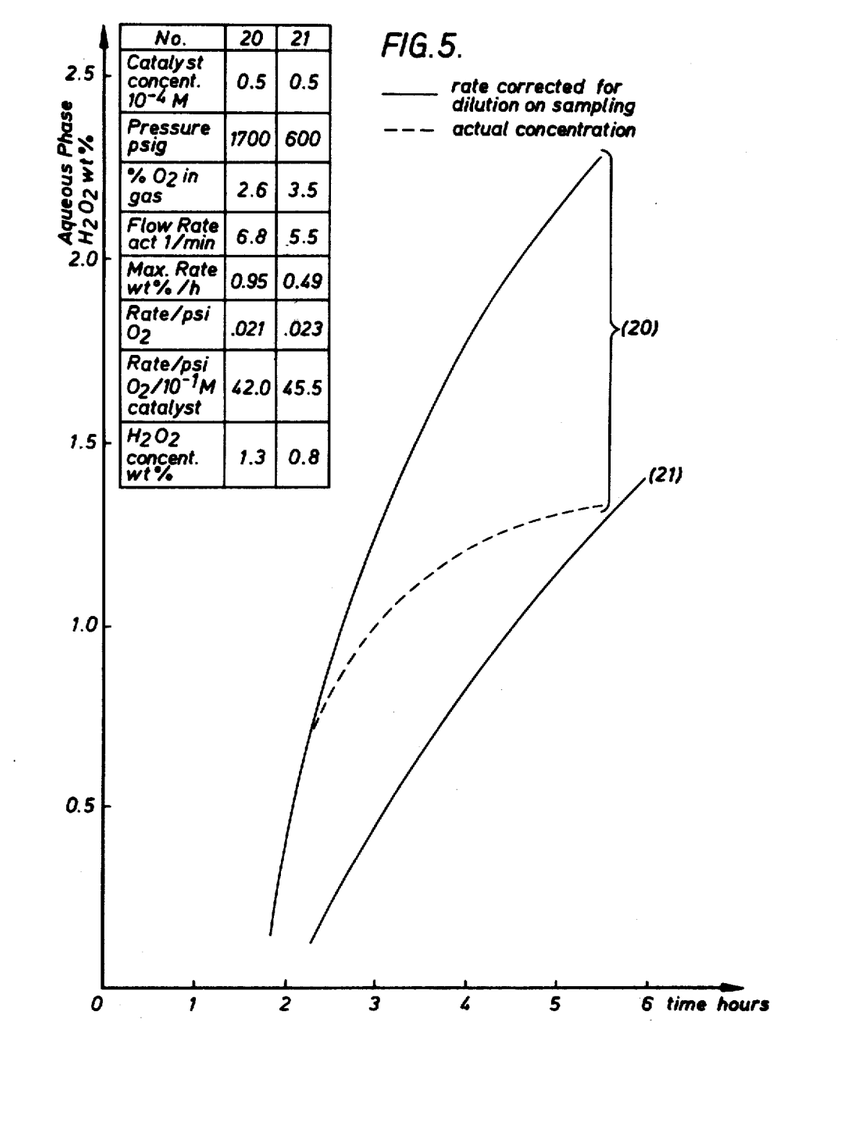
FIG. 5 illustrates embodiments of the present invention with respect to a fluorocarbon, perfluoro-1,3-dimethylcyclohexane.

Examples 20–21 (FIG. 5) illustrate embodiments of the present invention with respect to a fluorocarbon, perfluoro-1,3-dimethylcyclohexane, in which the solubility of Pd $Cl_2$ $(P(C_6F_5)_3)_2$ is limited to about $5 \times 10^{-5}$M. Although the results are not as good in terms of hydrogen peroxide concentration achieved as with 1,1,2-trichlorotrifluoroethane, the specific maximum rate in wt%/h/psi $O_2$ and catalyst activity are of similar values.

Using 1,1,2-trichlorotrifluoroethane as the halofluorocarbon solvent, Examples 22–26 (FIG. 6) illustrate embodiments of the present invention with respect to the effect certain types of additives have on the linearity of the rate of production of hydrogen peroxide over extended periods. In these examples, sparging was stopped after 6 hours and the reactor contents left quiescent under full gas pressure overnight before restarting sparging 16 hours later. The examples are however plotted as continuous curves that represent the variation in rate of hydrogen peroxide production (adjusted for the dilution following sampling) over the actual time in which gas was sparged through the reactor. The concentration of hydrogen peroxide in the aqueous phase fell during the quiescent period but in the case of the more linear examples 23–27 was reproduced during the subsequent 6 hour sparging period.

Figure 6:
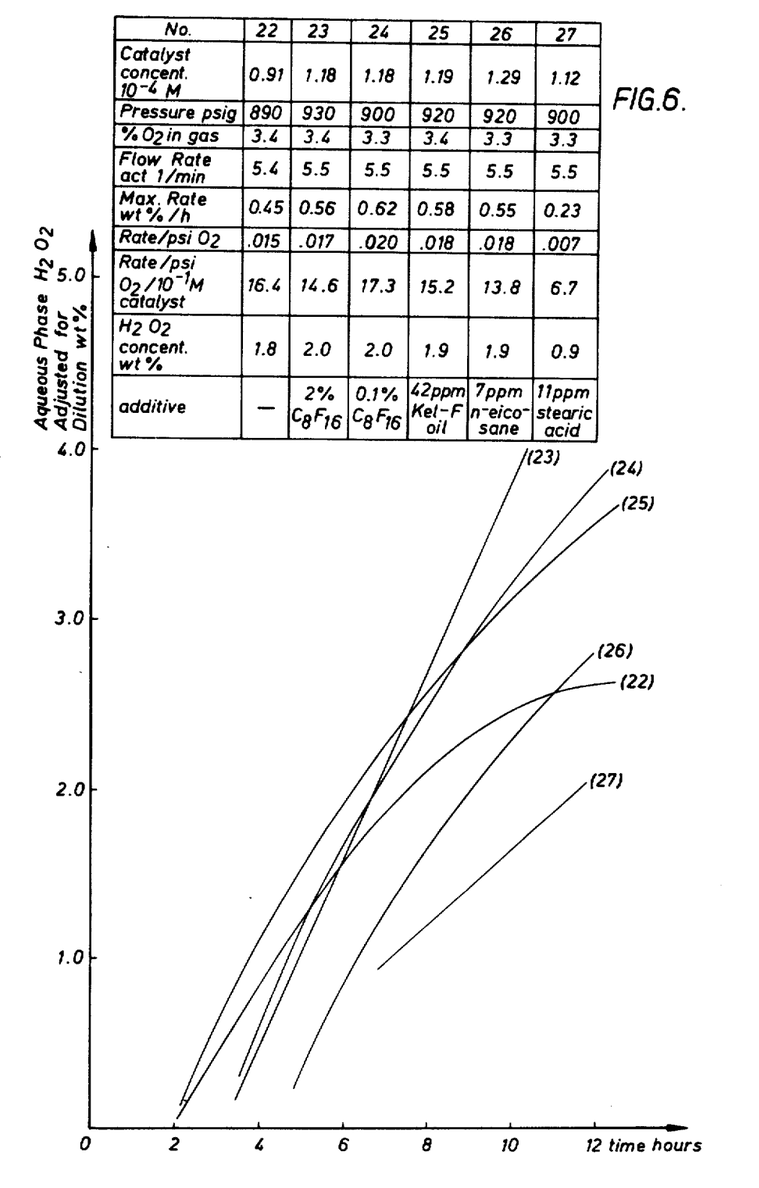
FIG. 6 illustrates embodiments of the invention with respect to the effect of certain types of additives on the linearity of the rate of production of hydrogen peroxide over extended periods.

It can be seen that excellent results in terms of specific rate/psi $O_2$, linearity and reproducibility, and catalyst activity are obtained using a halofluorocarbon organic phase and a polymeric halofluorocarbon, or more preferably, a perfluoracarbon, additive.

Whilst a survey of the examples is included in this description, details of each of the examples are included alongside the relevant graphs to assist the reader. In this connection it is noted that the vertical axis are not drawn to the same scale in each graph.

In each of examples 1 to 10 and 20 to 26 less than 0.1 PPM palladium could be detected in the acqueous hydrogen peroxide product.

| SUMMARY: EXAMPLES 1 to 14 | | | | | | | | | | | | | | |
|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 |
| Catalyst concent. $10^{-4}$M | 0.91 | 2.42 | 6.23 | 18.0 | 68.2 | 1.28 | 4.56 | 0.74 | 1.36 | 1.50 | 6.33 | 13.2 | 28.7 | 47.6 |
| Pressure psig | 1780 | 1800 | 1800 | 1780 | 1780 | 890 | 990 | 600 | 600 | 600 | 1110 | 1140 | 1080 | 1180 |
| % $O_2$ in gas | 3.4 | 3.5 | 2.6 | 2.6 | 2.6 | 3.3 | 3.5 | 3.5 | 3.5 | 3.5 | 2.5 | 2.7 | 2.6 | 3.0 |
| Flow Rate act l/min | 5.3 | 5.8 | 5.8 | 5.8 | 5.8 | 5.6 | 5.4 | 5.3 | 5.2 | 5.7 | 11.0 | 10.0 | 10.0 | 11.0 |
| Max. Rate wt %/h | 0.91 | 1.36 | 1.38 | 1.68 | 1.43 | 0.85 | 0.78 | 0.53 | 0.55 | 0.88 | 0.21 | 0.31 | 0.44 | 0.55 |
| Rate/psi $O_2$ | .015 | .022 | .029 | .036 | .031 | .028 | .022 | .025 | .026 | .041 | .007 | .010 | .014 | .015 |
| Rate/psi $O_2$/ $10^{-1}$M catalyst $H_2O_2$ | 16.4 | 8.9 | 4.7 | 2.0 | 0.4 | 21.9 | 4.9 | 33.3 | 18.8 | 27.4 | 1.2 | 0.7 | 0.5 | 0.3 |

SUMMARY: EXAMPLES 1 to 14

| No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| concent. wt % | 3.2 | 4.7 | 3.5 | 2.5 | 2.7 | 1.7 | 1.5 | 1.2 | 1.7 | 2.0 | 0.8 | 1.0 | 1.5 | 1.1 |
| Organic Solvent | | | $CF_2ClCCl_2F$ | | | | | $CF_2ClCCl_2F$ | | | | $1,2\text{-}C_6H_4Cl_2$ | | |

SUMMARY: EXAMPLES 15 to 27

| No. | 15 | 16 | 17 | 18 | 19 | 20 | 21 | 22 | 23 | 24 | 25 | 26 | 27 |
|---|---|---|---|---|---|---|---|---|---|---|---|---|---|
| Catalyst concent. $10^{-4}M$ | 19.4 | 56.1 | 89.2 | 62.9 | 63.0 | 0.5 | 0.5 | 0.91 | 1.18 | 1.18 | 1.19 | 1.29 | 1.12 |
| Pressure psig | 1790 | 1800 | 1790 | 1810 | 1800 | 1700 | 600 | 890 | 930 | 900 | 920 | 920 | 900 |
| % $O_2$ in gas | 2.5 | 2.5 | 2.5 | 2.6 | 2.7 | 2.6 | 3.5 | 3.4 | 3.4 | 3.3 | 3.4 | 3.3 | 3.3 |
| Flow Rate act l/min | 5.7 | 6.9 | 8.0 | 6.9 | 6.6 | 6.8 | 5.5 | 5.4 | 5.5 | 5.5 | 5.5 | 5.5 | 5.5 |
| Max. Rate wt %/h | 0.41 | 1.17 | 0.77 | 0.70 | 0.90 | 0.95 | 0.49 | 0.45 | 0.56 | 0.62 | 0.58 | 0.55 | 0.23 |
| Rate/psi $O_2$ | .009 | .026 | .017 | .015 | .018 | .021 | .023 | .015 | .017 | .020 | .018 | .018 | .007 |
| Rate/psi $O_2$/ $10^{-1}M$ catalyst | 0.5 | 0.5 | 0.2 | 0.2 | 0.3 | 42.0 | 45.5 | 16.4 | 14.6 | 17.3 | 15.2 | 13.8 | 6.7 |
| $H_2O_2$ concent. wt % | 1.3 | 1.8 | 1.8 | 1.0 | 1.7 | 1.3 | 0.8 | 1.6 | 2.0 | 2.0 | 1.9 | 1.9 | 0.9 |
| Organic Solvent | | $1,2\text{-}C_6H_4Cl_2$ | | $C_6H_6$ | $C_8H_{10}$ | (perfluorinated dimethylcyclohexane) | | | | | $CF_2ClCCl_2F$ | | |
| Additives | | | | | | | | | 2% $C_8F_{16}$ | 0.1% $C_8F_{16}$ | 42ppm Kel-F -oil | 7ppm n-eico sane | 11ppm stearic acid |

We claim:

1. A catalyst formed by contacting hydrogen and oxygen with a liquid reaction mixture comprising water, an organic solvent which is a fluorocarbon, a halofluorocarbon, a perfluoroaliphatic ether, a perfluoroalkyl tertiary amine or a mixture thereof, and bis[tri(pentafluorophenyl)phosphine] palladium dichloride.

2. The catalyst of claim 1 wherein the organic solvent is a fluorocarbon, a halofluorocarbon or a mixture thereof.

3. A method of preparing a surface active catalyst film which method comprises the step of contacting hydrogen and oxygen with water and an organic solvent which is a fluorocarbon, a halofluorocarbon, a perfluoroaliphatic ether, a perfluoroalkyl tertiary amine, or a mixture thereof containing bis[tri(pentafluorophenyl)phosphine] palladium dichloride.

4. The method of claim 3 wherein the organic solvent is a fluorocarbon, a halofluorocarbon or a mixture thereof.

5. A catalyst system comprising the catalyst of claims 1 or 2 together with water and an organic solvent which is a fluorocarbon, a halofluorocarbon, a perfluoroaliphatic ether, a perfluoroalkyl tertiary amine or a mixture thereof.

6. The catalyst system of claim 5 wherein the organic solvent is a fluorocarbon, a halofluorocarbon or a mixture thereof.

7. The catalyst system of claim 6 wherein the organic solvent is a halofluorocarbon and further includes as an additive 1–50,000 ppm by volume of a perfluorocarbon, a polymeric halofluorocarbon of molecular weight greater than 300, or up to 50 ppm by weight of a $C_{10}$–$C_{30}$ straight chain hydrocarbon, carboxylic acid or a fluorinated equivalent thereof.

8. The catalyst system of claim 6 further comprising bis[tri(pentafluorophenyl)phosphine] palladium dichloride.

* * * * *